United States Patent
Borgesen

(10) Patent No.: US 8,598,729 B2
(45) Date of Patent: Dec. 3, 2013

(54) WAVE POWER PLANT

(75) Inventor: Are Borgesen, Haugesund (NO)

(73) Assignee: Tidal Sails AS, Haugesund (NO)

(*) Notice: Subject to any disclaimer, the term of this patent is extended or adjusted under 35 U.S.C. 154(b) by 228 days.

(21) Appl. No.: 13/285,217

(22) Filed: Oct. 31, 2011

(65) Prior Publication Data

US 2012/0038164 A1 Feb. 16, 2012

Related U.S. Application Data

(63) Continuation of application No. PCT/NO2010/000154, filed on Apr. 28, 2010.

(30) Foreign Application Priority Data

Apr. 30, 2009 (NO) .................................. 20091718

(51) Int. Cl.
*F03B 17/00* (2006.01)
(52) U.S. Cl.
USPC .............................................. 290/54; 60/398
(58) Field of Classification Search
USPC ........................................................ 290/54
See application file for complete search history.

(56) References Cited

U.S. PATENT DOCUMENTS

| | | | | |
|---|---|---|---|---|
| 3,978,345 A | * | 8/1976 | Bailey | 290/54 |
| 4,151,424 A | * | 4/1979 | Bailey | 290/54 |
| 4,210,821 A | * | 7/1980 | Cockerell | 290/53 |
| 4,495,765 A | * | 1/1985 | French | 60/398 |
| 7,650,749 B2 | * | 1/2010 | Borgesen | 60/495 |
| 8,278,776 B1 | * | 10/2012 | Arntz | 290/54 |
| 2004/0174019 A1 | * | 9/2004 | Diederich | 290/54 |
| 2007/0176430 A1 | * | 8/2007 | Hammig | 290/54 |
| 2008/0093859 A1 | * | 4/2008 | Catlin | 290/54 |
| 2010/0019498 A1 | * | 1/2010 | Pollack et al. | 290/53 |

FOREIGN PATENT DOCUMENTS

DE 2740939 A * 3/1979
WO WO 9421913 A1 * 9/1994

* cited by examiner

*Primary Examiner* — Joseph Waks
(74) *Attorney, Agent, or Firm* — Patricia M. Mathers

(57) ABSTRACT

A wave power plant is disclosed which has one or more foils that are pivotally movable about a body. The foil is set into an oscillating, pivotal motion about the body by the force of the waves. A power engine is mounted between the body and the foil and extract works as the foil pivots about the body. The foil and body are held submerged below the surface of the water to reduce the effects of extreme weather conditions on the structural components.

9 Claims, 4 Drawing Sheets

WAVE POWER PLANT

BACKGROUND INFORMATION

1. Field of the Invention

This invention relates to a wave power plant.

2. Discussion of the Prior Art

Wave power plants are known in a number of embodiments, which oftentimes exploit the alternating heights of waves. Best known are possibly the so-called tapered channel plants, oscillating fluid columns, and float-based pumps. What they have in common is that they oftentimes comprise relatively complex structures that are relatively costly, both in terms of installation, operation, and maintenance. Such structures have large and complicated surface structures that are exposed to the elements and, thus, may be severely affected by weather conditions.

BRIEF SUMMARY OF THE INVENTION

The object of the invention is to remedy or reduce at least one of the disadvantages of the prior art.

This object is achieved by providing a wave power plant, in which a submerged foil is pivotally supported about a body, and wherein the foil is structured so as to be set into a swinging or oscillating pivotal motion about the body. The body is pretensioned and is provided with a plurality of foils. A power engine, which is connected between the foil and the body, is structured so as to deliver power by means of the pivotal motion of the foil.

The foils are submerged and located below the water surface, for example, at 0.5 to 3 meters below the water surface. As a result, the foils are affected by the rolling motion of the waves, but their exposure to extreme weather conditions and other impacts is insignificant, compared to the exposure and its affects on equipment above the surface of the water.

The foils may be formed having any suitable shape, but a relatively elongated, teardrop-like cross section appears to provide the best degree of efficiency.

The body may be stretched across a cove or a strait. It is relatively simple to anchor the body on the shore, particularly when the shore is comprised of rocks.

The body may be connected to one or more stays, wherein one end portion each stay is connected to the body and the opposite end portion is anchored or fastened to the seabed. The stay is structured so as to keep the body at the desired depth and also to allow the stay to withstand torsional forces exerted on it by the body.

The stay may be hingedly connected to the foil and extend down to an anchor or fastener secured in the seabed, to prevent the foils from pivoting 180 degrees about the body.

The body may comprise a wire, a pipe or another suitable stay, and may comprise several parallel and separately extending portions.

The power engine may include a pump system, preferably a hydraulic pump connected to a hydraulic motor, whereby the hydraulic motor drives an electric generator. Advantageously, the hydraulic motor and the generator may be located onshore.

If appropriate, the power engine in the foil may be an electric generator.

A device according to the invention is able to exploit wave energy, even in areas close to land, and at a reasonable cost. Given that the active components are submerged, the device is only insignificantly exposed to extreme weather conditions.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
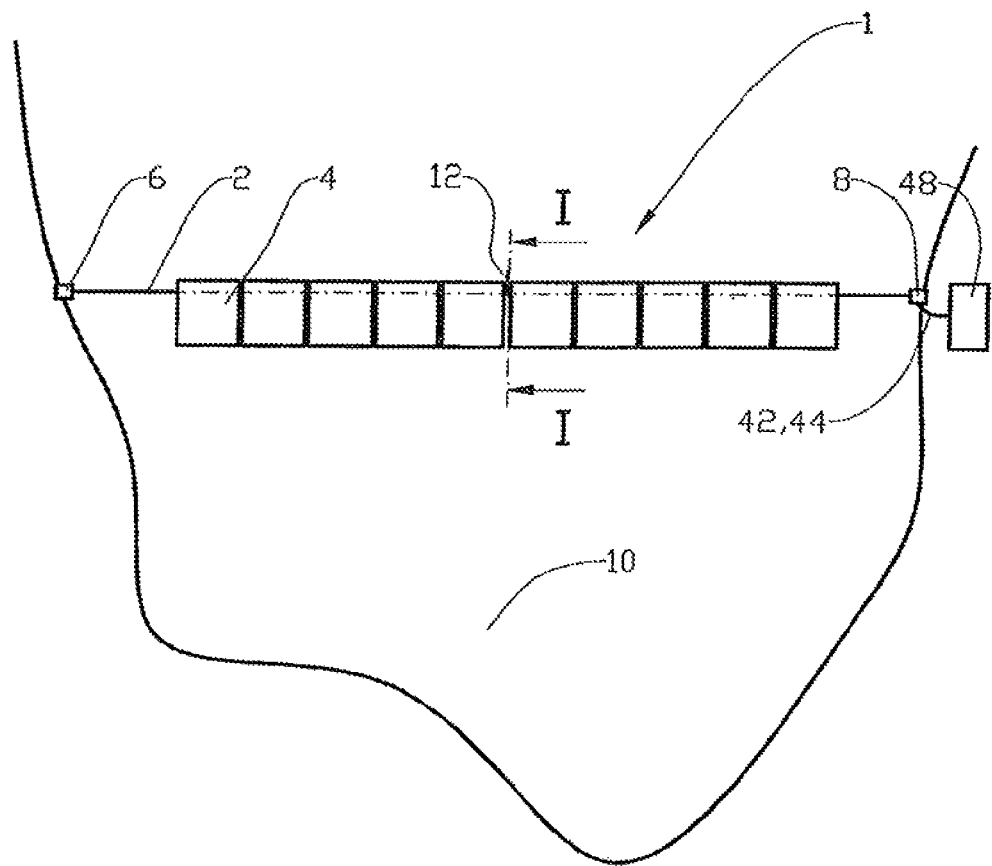
FIG. 1 is a schematic illustration, showing the wave power plant according to the invention, wherein the power plant is stretched across a cove.

FIG. 1 illustrates a wave power plant 1 stretched across a cove 10 and anchored at each end 6 and 8 to the shoreline. The wave power plant 1 comprises a plurality of foils 4 that are pivotably mounted on a body 2. In this particular embodiment, the body 2 comprises a pipe that is pretensioned between two fasteners or anchors, a first fastener 6 and a second fastener 8. As shown, the fasteners 6, 8 are located at either side of the cove 10. The body 2 is pretensioned between the fasteners 6, 8 by means of a tension device (not shown), for example, in the form of a tackle or a hydraulic cylinder, and the fasteners 6, 8 are constructed so as to be able to withstand tensional forces as well as torsional forces.

Figure 2:
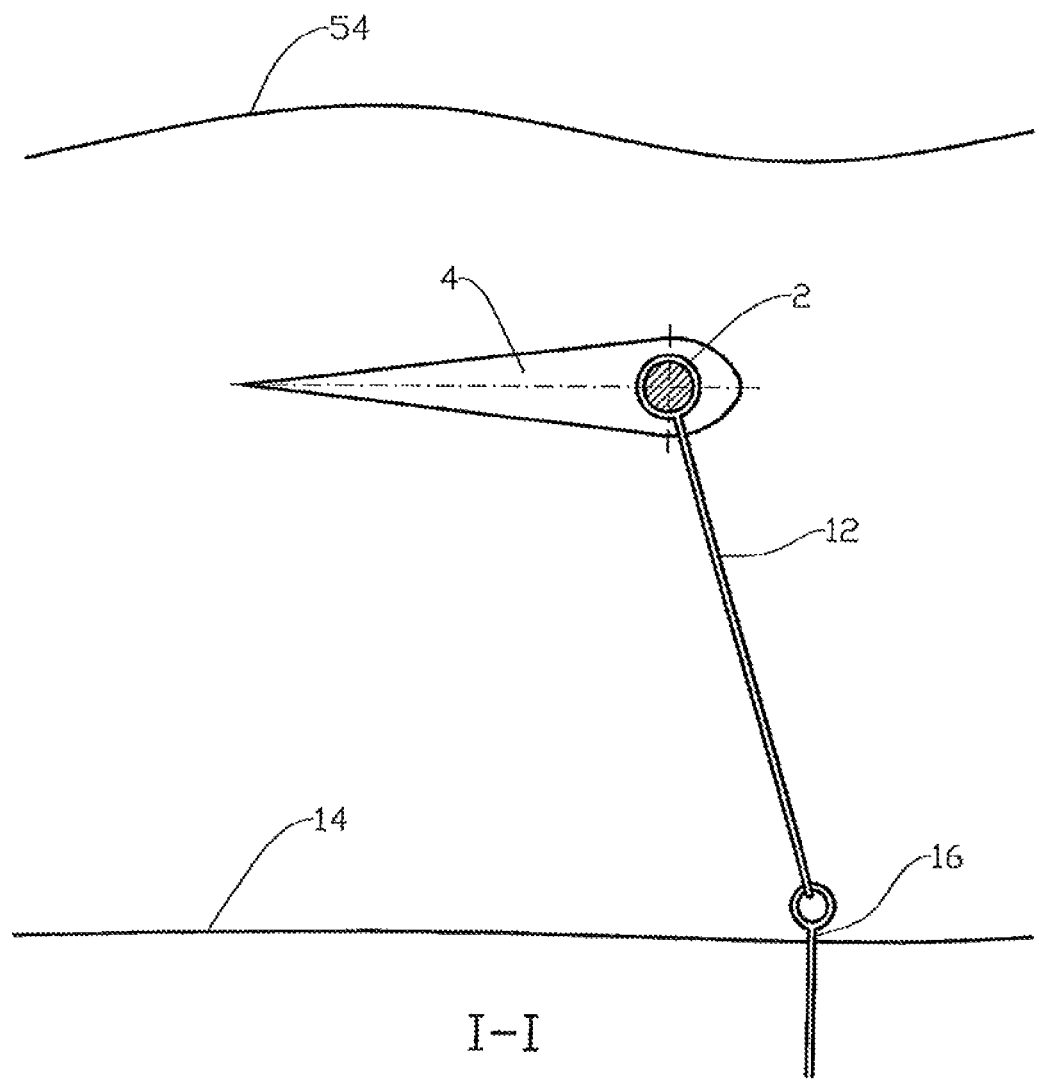
FIG. 2 is a cross-sectional illustration of a body anchored to the seabed.

FIG. 2 shows a stay 12 that couples the body 2 to a stay fastener 16. A first end of the stay 12 is connected in a torsional-stiff manner to the body 2 and between two foils 4 and a second end anchored to a seabed 14 by means of the stay fastener 16.

Figure 3:
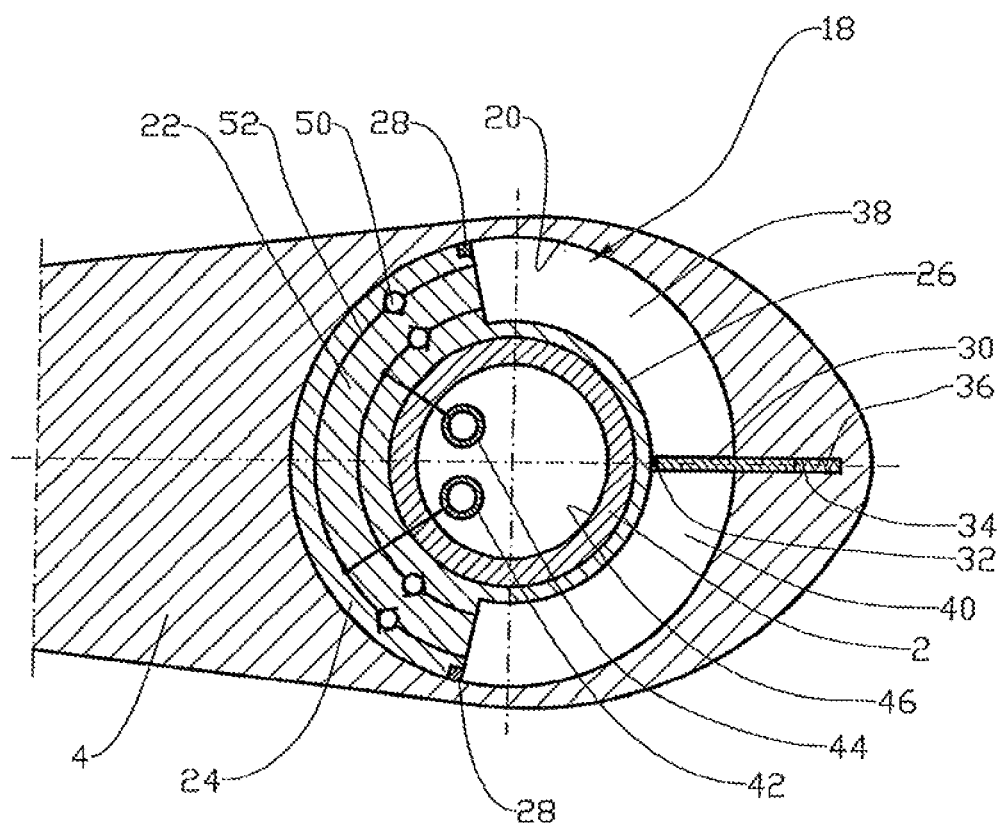
FIG. 3 is a cross-sectional view of a power engine disposed within a foil.

FIG. 3 shows a drive or power engine 18 disposed between the body 2 and each of the foils 4. In this embodiment, the power engine 18 is a hydraulic pump. The body 2 extends through a bore 20 in the foil 4. A sleeve 22 is attached to the body 2 and encircles it. The sleeve 22 has a relatively large outer radius over a first circular sector 24 and a smaller radius over a second circular sector 26. The first circular sector 24 is provided with sector gaskets 28 arranged so as to be able to seal the bore 20.

A wing 30 with a wing seal 32 is disposed in a movable manner in a wing slot 34 in the foil 4. The wing 30 is constructed to as to allow it to seal against the second circular sector 26. The wing 30 is pretensioned by means of at least one spring 36. The wing 30 divides a space, which is formed between the bore 20 and the second circular sector 26, into a first pump chamber 38 and a second pump chamber 40. A supply pipe 42 and a pressure pipe 44 extend within a cavity 46 in the body 2 and are connected to a hydraulic pump onshore. The two pump chambers 38, 40 communicate with the supply pipe 42 and the pressure pipe 44 via check valves 50 and conduits 52. The pump chambers 38, 40 are sealed in an axial direction by sealing end walls (not shown).

Referring still to FIG. 3, the operation of the wave power plant 1 is as follows: When a wave 54 lifts the foil 4 and causes the foil 4 to oscillate upwards, i.e. clockwise, hydraulic fluid flows in a manner known per se via respective conduits 52 and the check valve 50 from the supply pipe 42 into the first pump chamber 38. At the same time, pressurized hydraulic fluid flows via respective conduits 52 and the check valve 50 from the second pump chamber 40 to the pressure pipe 44. When the foil 4 pivots in the opposite direction, hydraulic fluid flows in a corresponding manner to the second pump chamber 40 from the first pump chamber 38.

The power engine 18 shown in FIG. 3 extracts work only as the foil 4 moves upward relative to the body 2, i.e., in one direction only. This power engine is, however, unsuitable if work is to be extracted as the foil 4 moves in different directions.

Figure 4:
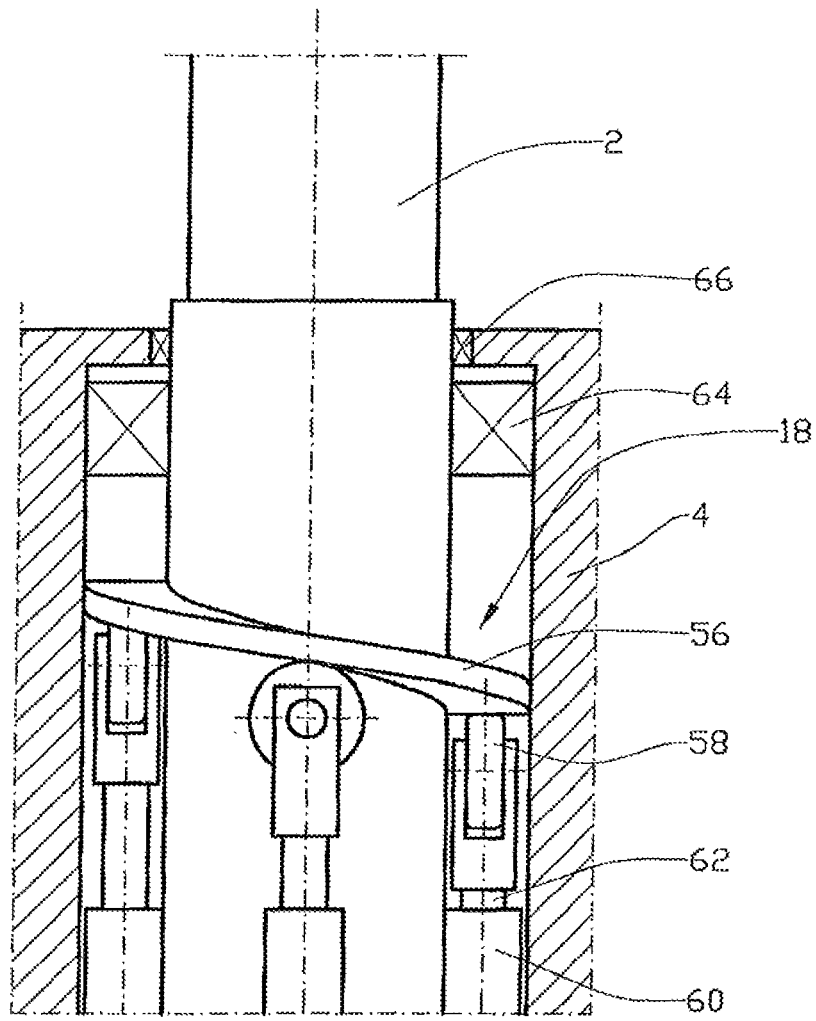
FIG. 4 is a cross-sectional view of a power engine in an alternative embodiment.

FIG. 4 illustrates an alternative embodiment of the wave power plant 1, in which work is extracted irrespective of the angle that the foil 4 assumes about the body 2. The power engine 18 comprises a cam 56 that encircles the body 2. Rollers 58, which are connected to respective piston rods 62 of hydraulic cylinders 60, bear against the cam 56 in the axial direction of the body 2. Several hydraulic cylinders 60 may be distributed about the body 2, insofar as a pilot pressure in a supply line (not shown) ensures that the rollers 58 bear against the cam 56 also during the plus-strokes of the piston rods 62.

Advantageously, the cam 56 may be attached to the foil 4, and the hydraulic cylinders 60 attached to the body 2. Axial forces due to the hydraulic cylinders 60 are supported by a bearing 64, and a seal 66 prevents water from entering into the bearing 64. Hydraulic liquid is pumped by means of the hydraulic cylinders 60 via valves (not shown) when the cam 56 is rotated relative to the cylinders 60. In this alternative embodiment, the power engine 18 may work irrespective of which angle the foil 4 assumes about the body 2.

It is understood that the embodiments described herein are merely illustrative of the present invention. Variations in the construction of the wave power plant may be contemplated by one skilled in the art without limiting the intended scope of the invention herein disclosed and as defined by the following claims.

The invention claimed is:

1. A wave power plant comprising:
a body that is pretensioned;
a foil that is pivotally supported about the body; and
a power engine that is mounted between the foil and the body;
wherein the foil is submerged in a body of water; and
wherein, when the foil moves in a pivotal motion about the body, the power engine extracts work from the pivotal motion of the foil.

2. The wave power plant of claim 1, wherein the foil includes a plurality of foils.

3. The wave power plant of claim 1, wherein the body is stretched across the body of water.

4. The wave power plant of claim 3, wherein the body of water is a cove.

5. The wave power plant of claim 1, further comprising a stay, a first end of the stay being connected to the body and a second end of the stay anchored to a seabed;
wherein the stay holds the body at a desired depth.

6. The wave power plant of claim 1, wherein the body comprises a wire.

7. The wave power plant of claim 1, wherein the body comprises a pipe.

8. The wave power plant of claim 1, wherein the power engine is a pump.

9. The wave power plant of claim 1, wherein the power engine is an electric generator.

\* \* \* \* \*